United States Patent [19]
Sakatani et al.

[11] Patent Number: 5,613,876
[45] Date of Patent: Mar. 25, 1997

[54] BODY-MOUNTED CONNECTOR

[75] Inventors: Athushi Sakatani; Nobuyosi Tanaka, both of Yokkaichi, Japan

[73] Assignee: Sumitomo Wiring Systems, Ltd., Yokkaichi, Japan

[21] Appl. No.: 486,249

[22] Filed: Jun. 7, 1995

Related U.S. Application Data

[62] Division of Ser. No. 67,607, May 27, 1993.

[30] Foreign Application Priority Data

May 29, 1992 [JP] Japan ................................. 4-138990

[51] Int. Cl.⁶ .................................................. H01R 13/74
[52] U.S. Cl. ...................... 439/552; 439/557; 296/146.5
[58] Field of Search ............................ 296/146.5, 146.1; 439/552, 557

[56] References Cited

U.S. PATENT DOCUMENTS

| | | |
|---|---|---|
| 2,891,103 | 6/1959 | Swengel . |
| 3,989,343 | 11/1976 | Lucius et al. . |
| 3,998,518 | 12/1976 | Mathe . |
| 4,687,276 | 8/1987 | Stockmaster . |
| 4,711,507 | 12/1987 | Noorily .................... 439/557 X |
| 4,815,984 | 3/1989 | Sugiyama et al. . |
| 5,279,507 | 1/1994 | Kameyama ..................... 439/552 |
| 5,372,523 | 12/1994 | Sakatani et al. . |

FOREIGN PATENT DOCUMENTS

| | | |
|---|---|---|
| 0258980 | 3/1988 | European Pat. Off. . |
| 0501393 | 9/1992 | European Pat. Off. . |
| 0536708 | 4/1993 | European Pat. Off. . |
| 2511459 | 9/1976 | Germany . |
| 3804086 | 8/1988 | Germany . |
| 52-92391 | 8/1977 | Japan . |
| 57-40275 | 8/1982 | Japan . |
| 60-99789 | 7/1985 | Japan . |

*Primary Examiner*—Joseph D. Pape
*Attorney, Agent, or Firm*—Greenblum & Bernstein P.L.C.

[57] ABSTRACT

A body-mounted connector having on one side a shroud with a mating connector socket and on the other side a terminal housing member. The connector is secured to the body member of an automobile with the front edge of the shroud projecting from a mounting hole opened in the body member. A spacer can slide freely along the inside surface of the shroud. An initial engagement member for holding the spacer in the partially engaged position is formed on the shroud. A movable locking member projects at the front edge of the shroud. The spacer slides along the movable locking member such that when the spacer is moved to the main engagement position, the movable locking member moves with the spacer to the body engagement position, and locks the connector to the body member.

6 Claims, 7 Drawing Sheets

BODY-MOUNTED CONNECTOR

This application is a division, of application Ser. No. 08/067,607, filed May 27, 1993, pending.

BACKGROUND OF THE INVENTION

1. Field of the Invention

The present invention relates to a connector and, more particularly, to a body-mounted connector that is securely fastened to either the door body or the vehicle body of an automobile with a spacer, and is connected with the mating member after being fastened to the automobile body.

2. Description of the Prior Art

Figure 11:
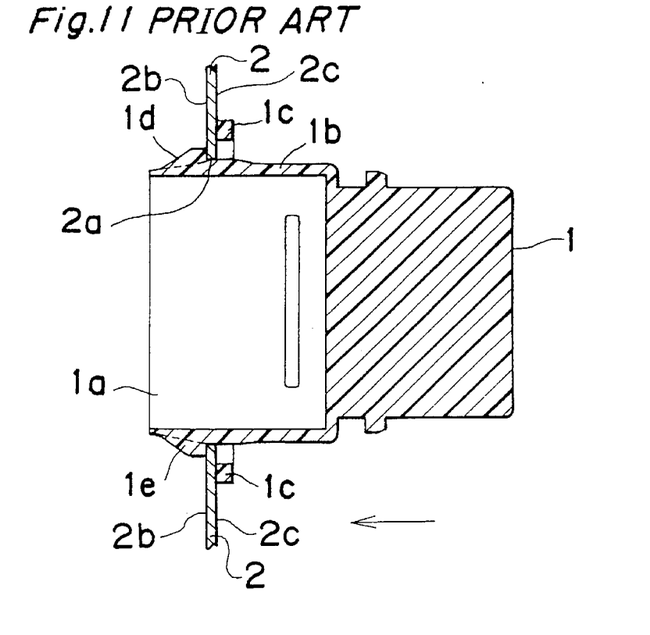
FIG. 11 is a cross-sectional view showing a conventional body-mounted connector fastened to the door body member of the automobile.

Conventionally, a body-mounted connector of the type that is fastened to the vehicle body or to the door body (so-called door-mounted connector). The door-mounted connector 1 is provided with a body engaging tabs 1c projecting from the inside of the shroud 1b having a mating connector socket 1a formed therein. Engaging arms 1d and 1e are formed on top and bottom edges of the socket opening 1a, respectively, in a tapered shaped projecting therefrom, as shown in FIG. 11. Note that the right area of FIG. 11 with respect to a door body member 2 shows the inside of the door body, and the left area shows the exterior side of the door body.

The door-mounted connector 1 is inserted in the direction of the arrow to a mounting hole 2a formed in the door body member 2. The engaging arms 1d and 1e projecting perpendicularly from the shroud 1b pass through the edges of the door body member 2a by flexing themselves. As a result, the engaging arms 1d and 1e and the body engaging tabs 1c are in contact with the outside surface 2b and inside surface 2c, respectively, of the door body member 2. Thus, the body-mounted connector 1 is fastened to the door body member 2 with the door body member 2 sandwiched between the engaging arms 1d and 1e and the body engaging tabs 1c.

Figure 12A:
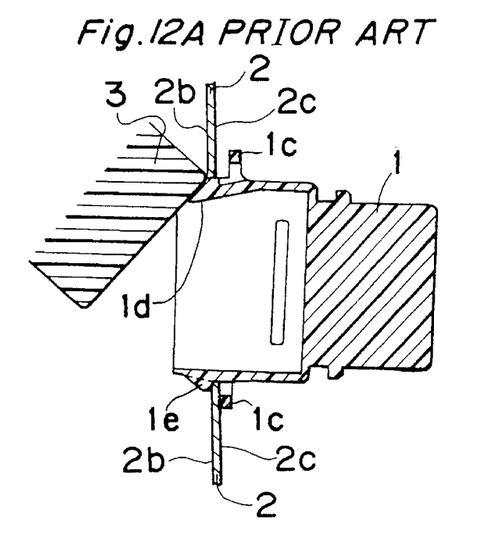
FIGS. 12A and 12B are cross-sectional views showing the conventional body-mounted connector of FIG. 11 at respective states.
Figure 12B:
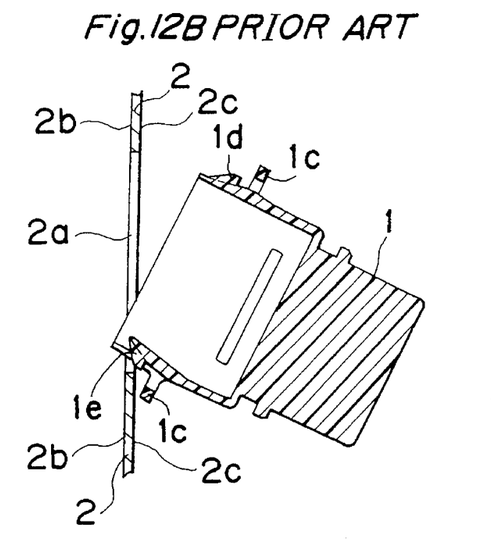

When the mating connector 3 is connected to the body-mounted connector already fastened to the door body member 2, as shown in FIG. 12A, there is often little clearance for inserting the mating connector 3. Thus, the mating connector 3 must be inserted not in the coaxial direction, but in an inclined direction with respect to the socket opening 1a. In this case, the end of the connector 3 contacts and flexes the engaging arm 1d projecting on the top of shroud 1b, effectively disconnecting the engagement with the door body member 2. When the engaging arm 1d is thus disengaged, the body-mounted connector 1 tilts, as shown in FIG. 12B, the bottom engaging arm 1e is disengaged from the door body member 2, and as a result the connector 1 falls out to the bottom.

In the case of a door-mounted connector in particular, if the connector disengages from the door body member and falls, it falls inside the door, and the problem is that it cannot be easily retrieved.

In addition, with a conventional body-mounted connector as described, a large operating force is required during installation because the engaging arms are forcefully flexed during insertion to the body, and when repeatedly inserted and removed, the spring of the engaging arms is lost; another problem has been that the engaging force with the body weakens.

SUMMARY OF THE INVENTION

The object of the present invention is therefore to provide a connector which solves these problems.

The present invention has been developed with a view to substantially solving the above described disadvantages and has for its essential object to provide an improved body-mounted connector.

In order to achieve the aforementioned objective, a body-mounted connector used to mount in a connector mounting hole formed in the body member for connecting to a mating connector comprises connector means provided on one side thereof, said connector means being engageable to said mating connector; first engaging means provided on said connector means, said first engaging means being engageable to one side surface of said body member; second engaging means movably provided on said connector means at a position opposed to said first engaging means, said second engaging means being engageable to another side surface of said body member; and pressing means provided beside said second engaging means for pressing said second engaging means against said body member toward said first engaging means such that said connector is firmly secured in said connector mounting hole by clamping said body member between said first and second engaging means.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 1:
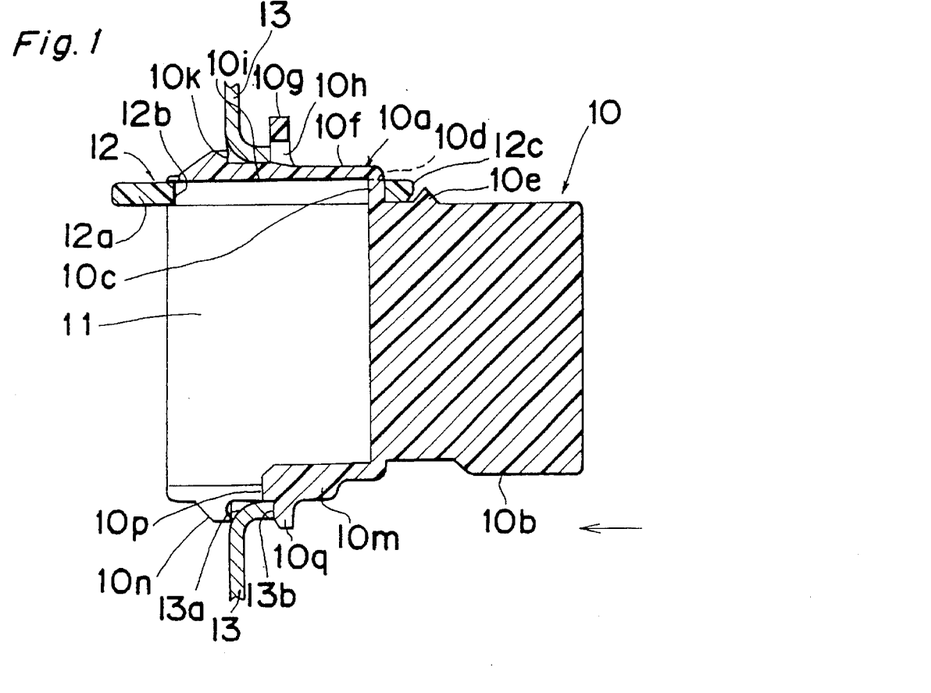
FIGS. 1 and 2 are cross-sectional views showing a body-mounted connector according to a first embodiment of the present invention.
Figure 2:
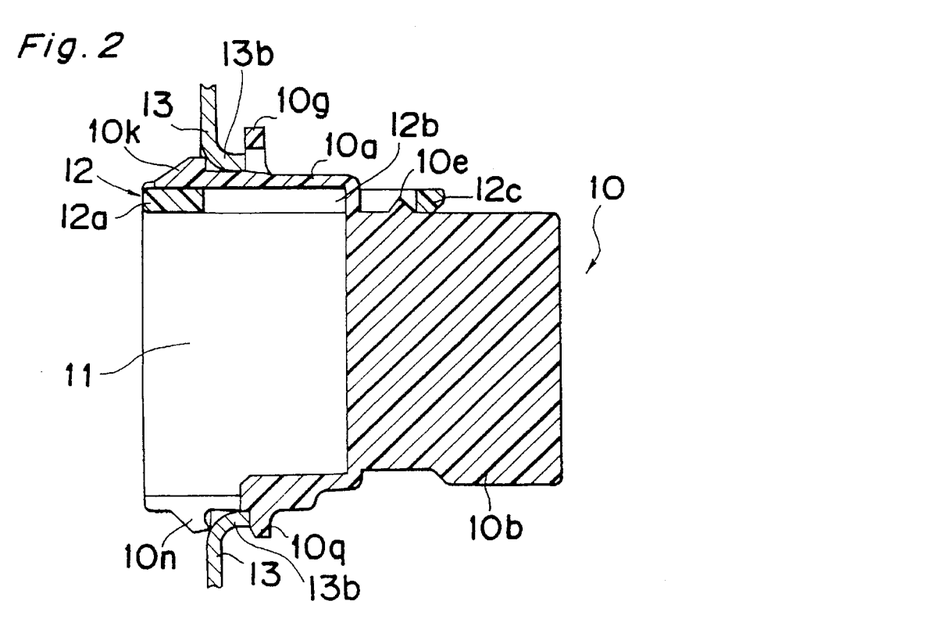

Referring to FIGS. 1 and 2, a body-mounted connector that is fastened to a door body member 13 (so-called door-mounted connector) of automobile according to a first embodiment of the present invention is shown. Note that the right area of FIG. 1 with respect to the door body member 13 shows the inside of the door, and the left area shows the exterior side of the door. The door body member 13 has a connector mounting hole 13a formed therein for receiving the connector 10 therein. A flange portion 13b bent toward the inside of the door is integrally provided around the connector mounting hole 13a.

The connector 10, hereinafter referred to as "a connector", comprises a shroud 10a having a top wall 10f, a bottom wall 10m, and side walls defining a connector socket 11 opened at the front thereof for insertion of a mating connector (not shown). A multiple lead terminal housing member 10b is integrally provided at the back side of shroud 10a, and is smaller than the shroud 10a. The shroud 10 extends from the front outside circumference of the terminal housing member 10b.

A through-hole 10d is formed at the top of a back end wall 10c of the shroud 10a for receiving a flat shaped spacer 12 therein. An engagement projection 10e is formed on the top surface of the terminal housing member 10b at a position behind the through-hole 10d for initially being opposed to the spacer 12 inserted therein in the right direction before engagement, as shown in FIG. 1.

A body engaging member 10g is provided at the top wall 10f of the shroud 10a and vertically projecting therefrom, and is provided with a cut-out 10h formed in the middle thereof. A movable locking member 10i is provided in the top wall 10f of the shroud 10a.

Both side edges of the movable locking member 10i are cut in and separated from the front edge of the top shroud wall 10f, allowing the movable locking member 10i to be vertically displaced, and a lock claw 10k sloping up to the back is formed at the front top end of the movable locking member 10i.

Engaging members 10n projecting with a slope projecting downward from the front toward the back are provided on both sides at the front end of the bottom wall 10m of the shroud 10a, a cut-out 10p is formed between these engaging members 10n. Another engaging member 10q projecting downward is formed at the back of the cut-out 10p and at the middle portion when viewed from a side of socket opening 11.

The spacer 12 installed in this connector 10 is flat, and has a front-to-back channel 12b formed in the middle thereof such that a front end pressing member 12a and a back end 12c are formed at front and back edge portions, respectively. The back end 12c of the spacer 12 is inserted through the spacer through-hole 10d of the connector 10 and installed such that the spacer 12 can slide freely along the inside (bottom) surface of the top wall 10f of the shroud 10a. When the spacer 12 is located at a partially engaged position in which the back end 12c partially engages with the projection 10e, the moveable looking member 10i is positioned above the channel 12b, and the front end pressing member 12a extends from the front of the shroud 10a.

When the spacer 12 is initially engaged at the intially engaged position, (after the position shown in FIG. 1), the connector 10 is inserted to the connector mounting hole 13a in the door body member 13 from the inside (right) to the outside (left) of the door in the direction of the arrow.

During insertion of the connector 10 at the top wall side 10f, the movable locking member 10i can be bent downward through the channel 12b even when pressed by the upper flange 13b. The connector 10 can easily pass the door body member flange portion 13b to the position at which the engaging members 10g and 10q contact with the free ends of the flange 13b. At the point the movable locking member 10i passes the flange 13b, it springs back up and the back end of the lock claw 10k engages the front edge of the connector mounting hole 13a. In this position the door body member 13 is sandwiched between the movable locking member 10i (10k) and the opposing body engaging member 10g. The body engaging member 10g stops against the free end of the flange 13b and the back end of the lock claw 10k stops against the front curved surface of the flange 13b, as shown in FIG. 1.

At the bottom wall 10m side, each back end of engaging members 10n stops against the front curved surface of the door body member 13, and the engaging member 10q stops at the middle portion of the free end of the flange 13b. Thus, the door body member 13 is alternately engaged by the engaging members 10n and 10q.

When the spacer 12 is then pushed back, toward the inside of the door, the back end 12c thereof rides over the projection 10e such that the pressing member 12a at the front is positioned below the movable locking member 10i (particularly below the lock claw 10k). The engagement projection 10e is inserted to the back end of the channel 12b, completely locking the spacer 12. Since the spacer 12 can support the movable locking member 10i upwardly against the downward pressure by the door body member 13, the door body member 13 is firmly locked between the engaging members 10g, 10f, and 10k. The connector 10 is firmly locked to the door body member 13b, as best shown in FIG. 2.

Thus, the connector 10 with the spacer 12 at the partially engaged position therein can be smoothly inserted to the connector mounting hole 13a of the door body member 13. By pressing after insertion, the spacer 12 moves to the main locking position, locking the movable locking member 10i of the connector 10 to the door body member 13. As a result, the connector 10 is positively fastened to the door body member 13, and even if, for example, the mating connector inserted from above (shown in FIG. 12A) contacts the movable locking member 10i, the movable locking member 10i will not flex and the connector will not disengage from the door body member 13 because the movable locking member 10i is pressed and held by the spacer 12. Conversely, when the mating connector is inserted from below, the engaging member does not project from the front on the insertion side, does not contact the mating connector, and the connector is therefore not disengaged.

Figure 3:
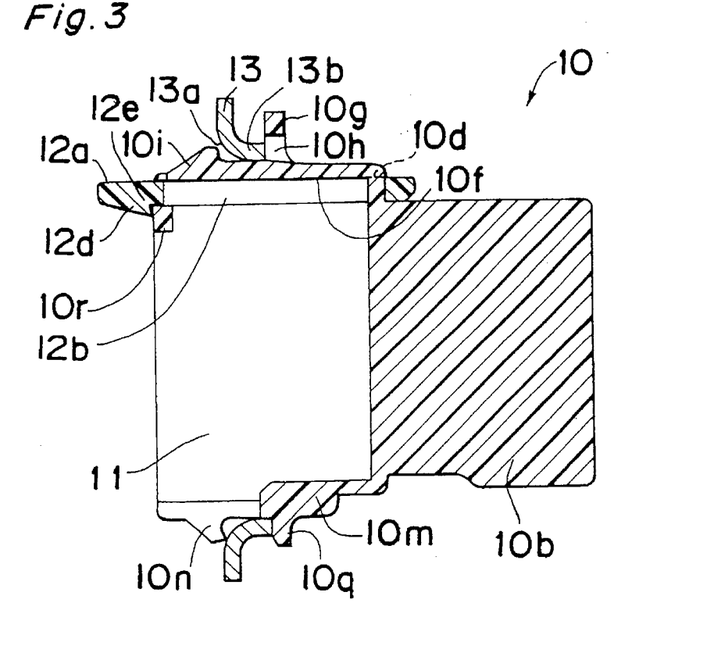
FIGS. 3 and 4 are cross-sectional views showing an alternative of the body-mounted connector of FIG. 1.
Figure 4:
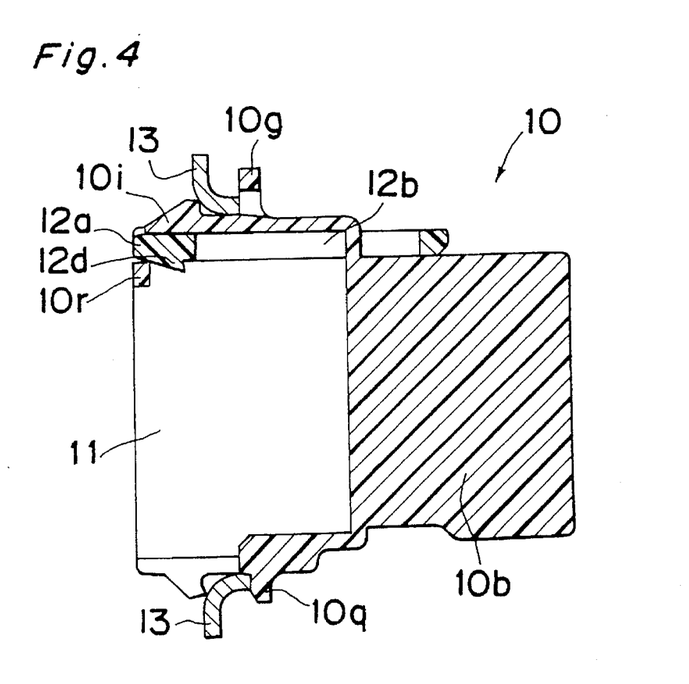

Referring to FIGS. 3 and 4, an alternative of the body-mounted connector of FIG. 1 is shown. In this alternative, the partial engagement projection 10e of FIG. 1 is replaced by an engagement member 10r provided on a position below the front edge side of the shroud 10a, and an engagement claw 12d sloping down to the back is additionally formed at the front bottom end of the spacer 12. The rest of the configuration of this alternative is the same as that of the connector shown in FIG. 1.

Specifically, the engagement member 10r for initially engaging the spacer 12 is located such that the spacer 12 can be inserted in the space between the top wall 10f and the engagement member 10r. An engaging member 12d is provided projecting at a downward angle from the front bottom edge of the pressing member 12a, and a recess 12e having a configuration engageable with the engagement member 10r is provided at the back edge of the engaging claw 12d.

In the initially engaged position of this connector 10, i.e., when the recess 12e in the engaging claw 12d is engaged with the engagement member 10r, the pressing member 12a protrudes from the front of the shroud 10a, and the movable locking member 10i is positioned above the channel 12b. The connector 10 with the spacer is inserted in the connector mounting hole 13a and is temporality secured therein, as best shown in FIG. 3.

Then, the movable locking member 10i is pressed against the body 13 and locked by the pressing member 12a, sandwiching the spacer 12 engaging member 12d between the movable locking member 10i and engagement member 10r, and locking the spacer 12, as best shown in FIG. 4.

Referring to FIGS. 5 to 10, a door-mounted connector according to a second embodiment of the present invention is shown. A connector 20 has a construction similar to those of connectors described above. However, the connector includes a spacer 40 which is automatically released from the initially engaged state by contact with the edge of the door body member flange 13b during insertion of the connector 20 in the connector mounting hole 13a.

Figure 5:
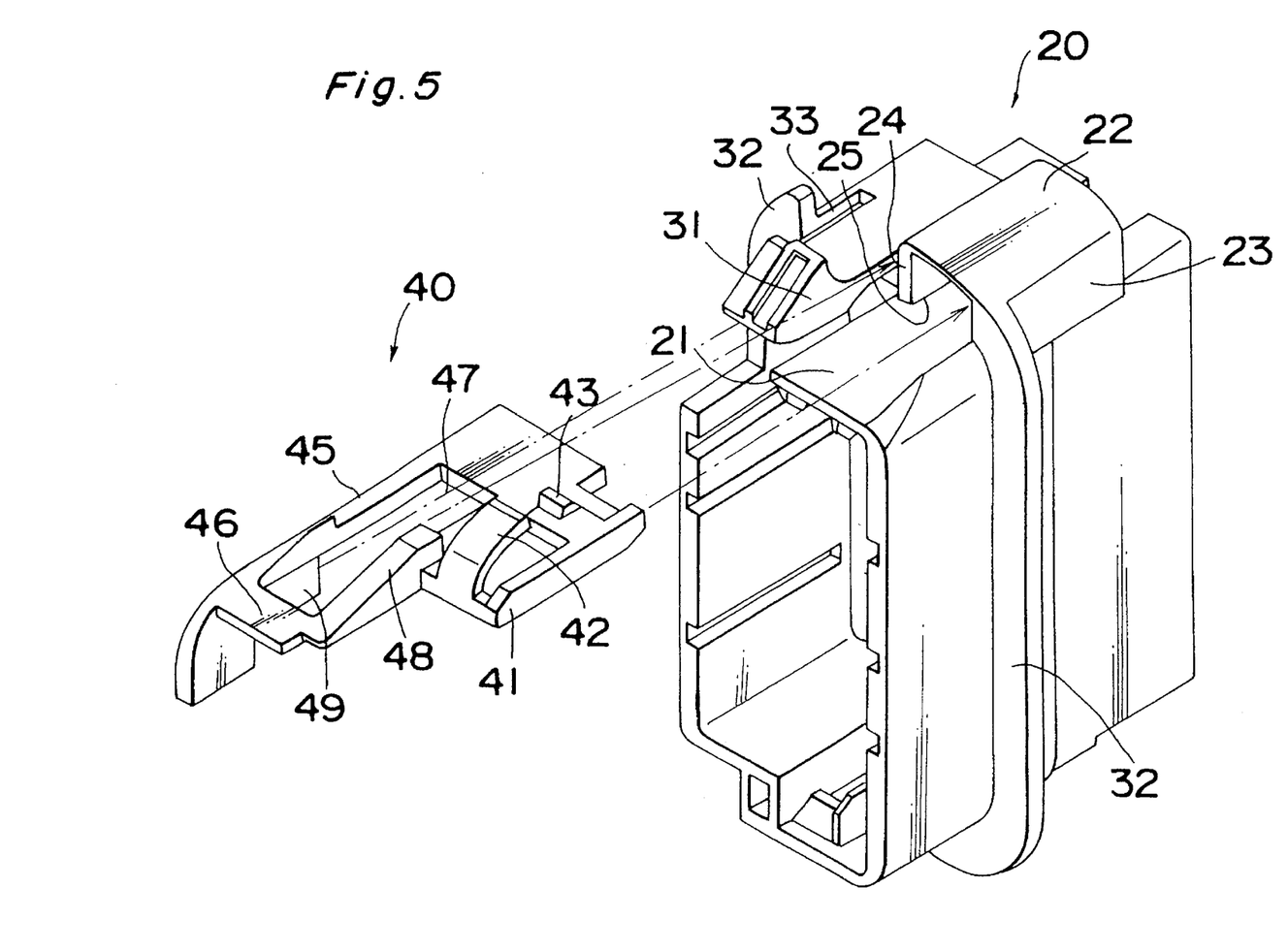
FIG. 5 is a perspective exploded view showing a body-mounted connector according to a second embodiment of the present invention.

The connector 20 has a box-shaped arm housing 22 formed one side, right side when viewed from a side of the socket opening in FIG. 5, and at the back of the top wall 21 of the housing. The arm housing 22 is opened at the shroud-side. The outside wall 23 of the arm housing 22 is continuous with the top wall 21, and the inside wall 24 is separated from the top wall 21, forming a spacer sliding space 25 therein.

Figure 7:
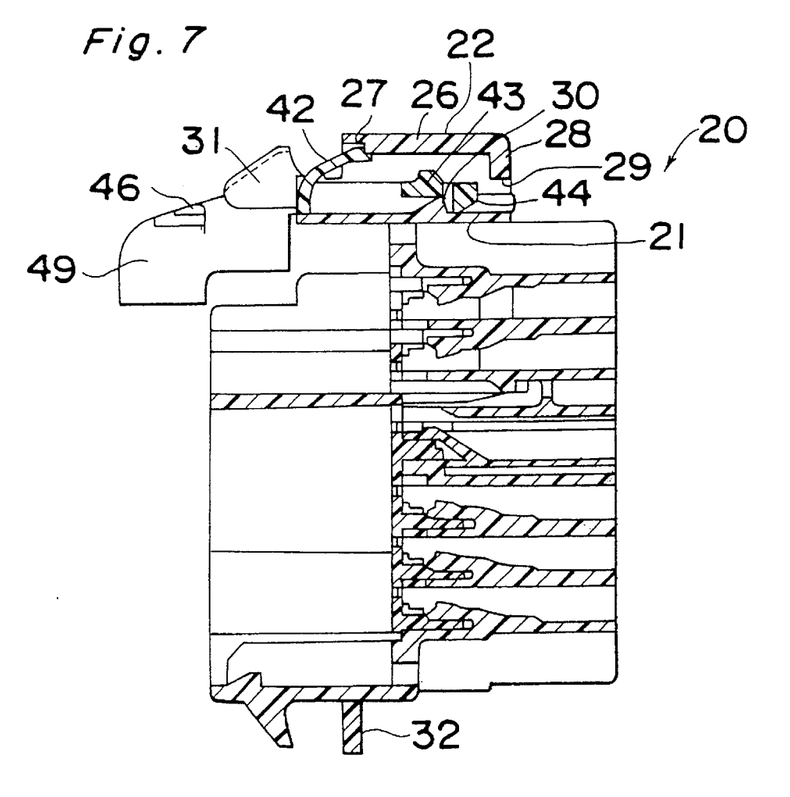
FIG. 7 is a cross-sectional view showing the body-mounted connector of FIG. 6, FIGS. 8A, 8B, 8C, and 8D are cross-sectional views showing the process of mounting the body-mounted connector of the second embodiment to the door body member.

As shown in FIG. 7, the arm housing 22 has a recessed member 27 for partially engaging the spacer 40 formed at the inside front of the top wall 26 thereof. The arm housing 22 further has a spacer through-hole 29 provided in the back end wall 28, and an engagement projection 30 projecting from the bottom wall (i.e., the housing top wall 21) thereof.

Referring back to FIG. 5, on the other side (left side) of the housing top wall 21 is provided with a movable locking member 31 projecting to the front side with a gap to the arm housing 22. In addition, a spacer insertion channel 33 is formed on the topside of the movable locking member 31, and is extending from the front edge toward the backside thereof. The connector 20 further includes a body engaging member 32 projecting around the outside surface of the connector housing 20 such that the front face of the body engaging member 32 is in alignment with the front open edge of the arm housing 22.

The spacer 40 mainly comprises two side members 42 and 45 which are located on the right and left sides, respectively, when viewed from the left side in FIG. 5. The left side member 45 is longer than the right side member 41 such that the front end of the left side member 45 extrudes from the front end of the right side member 41 by a predetermined length, as best shown in FIG. 5. The right side member 41 is provided with an arm 42 curving up and to the back at the front edge thereof, a partial engagement projection 44 projecting down at the back edge thereof, and a main engagement projection 43 projecting up therebetween, as best shown in FIG. 7. The left side member 45 has a front-to-back channel 47 formed in the middle thereof such that a front end pressing member 46 is formed at front edge portion thereof. A guide member 48 projecting up is formed on one longer side proximal to the right side member 41, and is tapered from the front to the back side. On another longer side opposing to the guide member 48, a guide piece 49 extending downward from the front edge having a configuration for insertion to the spacer insertion channel 33 is provided.

Figure 6:
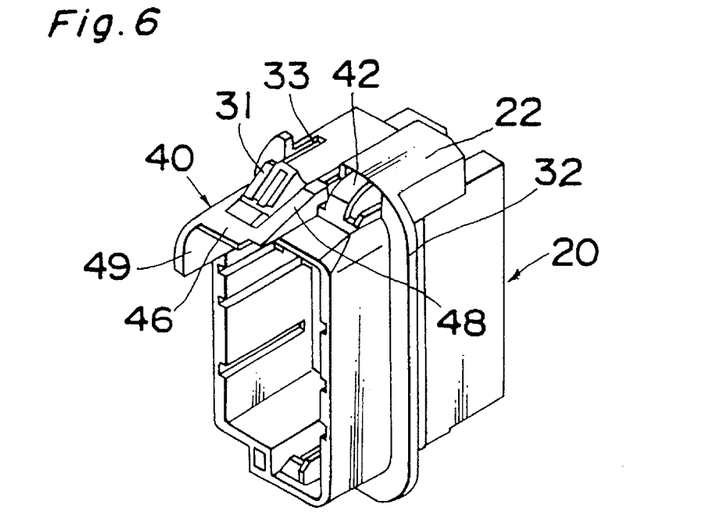
FIG. 6 is a perspective view showing the body-mounted connector of FIG. 5.

In FIGS. 6 and 7, the connector 20 when the spacer 40 is initially engaged therein is shown. The right side member 41 of the spacer 40 is inserted inside the arm housing 22, the front arm 42 is engaged with the recessed member 27 formed at the front top of the arm housing 22, the back engagement projection 44 is positioned behind the engagement projection 30, and the spacer 40 is thus initially engaged with the connector 20.

In this initially engaged position, the left side member 45 of the spacer 40 is inserted below the movable locking member 31, the movable locking member 31 is positioned above the channel 47, and the front pressing member 46 projects from the front of the shroud. In addition, the guide member 48 is inserted between the movable locking member 31 and the arm housing 22, and the guide piece 49 is inserted to the front of the spacer insertion channel 33. In other words, the spacer 40 cannot move from side to side.

The operation whereby the connector 20 with an engaged spacer 40 is inserted to the connector mounting hole 13a and fastened to the door body member 13 is described with reference to FIGS. 8A, 8B, 8C, and 8D.

Figure 8A:
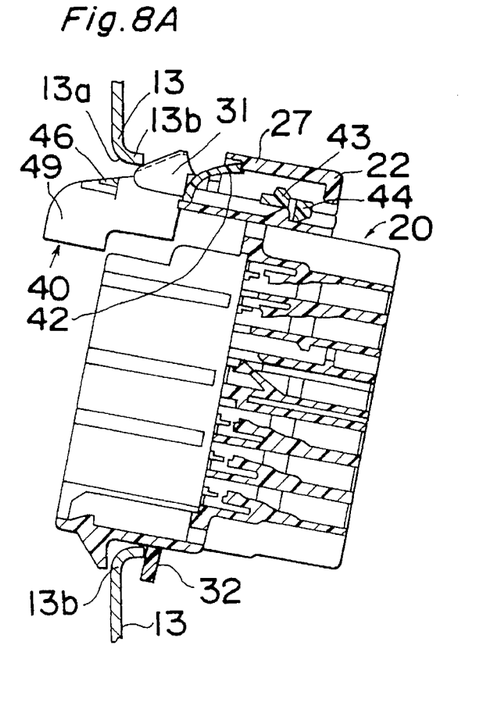
Figure 8B:
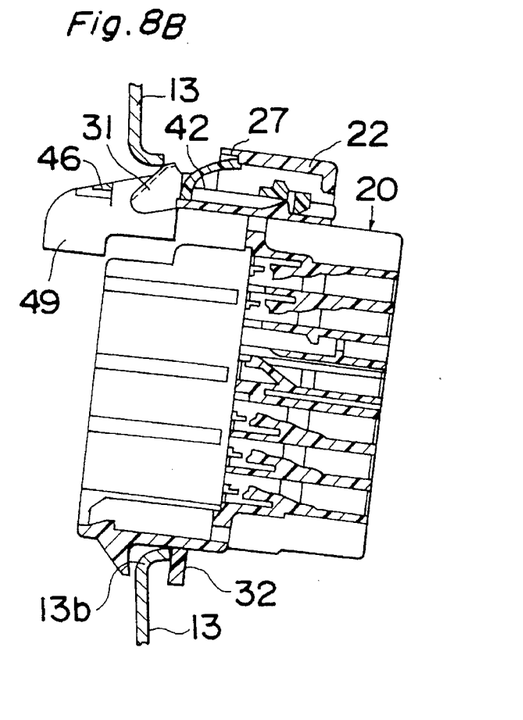
Figure 8C:
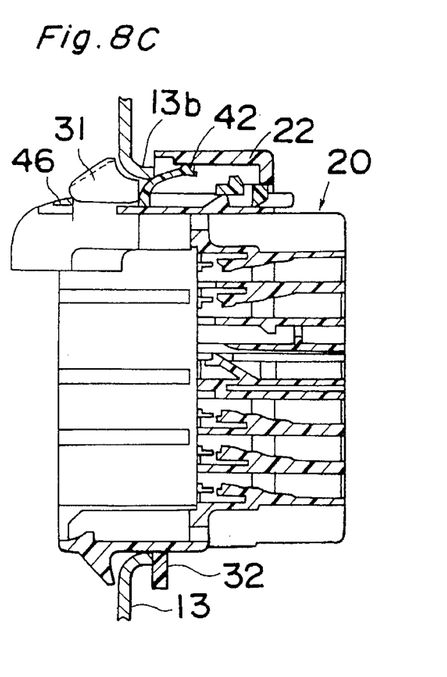

When the connector 20 is inserted in the connector mounting hole 13a at an angle during installation to the door body member 13 (FIG. 8A), the engaging member on the bottom of the connector 20 is first inserted, and then the top side is inserted. In this case, the upper edge of the door body member flange 13b contacts the projecting movable locking member 31, the movable locking member 31 bends into the channel 47 (FIG. 8B), and insertion is possible. As a result, by pressing forward on the connector 20, the movable locking member 31 moves past the door body member flange 13b and is inserted to the front side of the door body member 13 (FIG. 8C).

Figure 9:
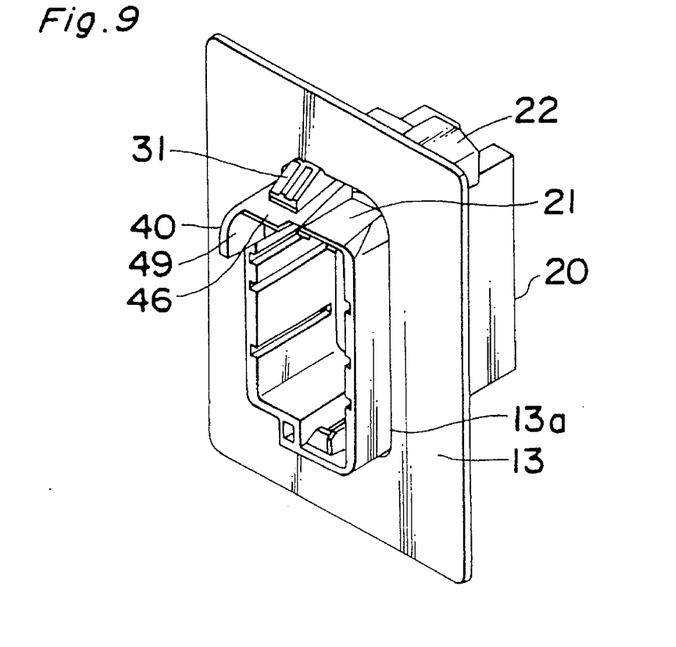
FIG. 9 is a perspective view showing the body-mounted connector at the state shown in FIG. 8C.

When the movable locking member 31 separates from the flange 13b, it returns to its original position and projects up, and the back end of the movable locking member 31 engages the front side of the door body member 13. Slightly before this stage, the front edge of the flange 13b contacts the spacer arm 42, pressing the arm 42 down. As a result, the arm 42 separates from the recessed member 27 of arm housing 22. The temporary engagement of the spacer 40 with the connector 20 is thus released by this operation inserting the connector 20 to the connector mounting hole 13a and the spacer 40 can be moved to the back. In FIG. 9, a perspective view of the connector at the state of FIG. 8C is shown.

Figure 8D:
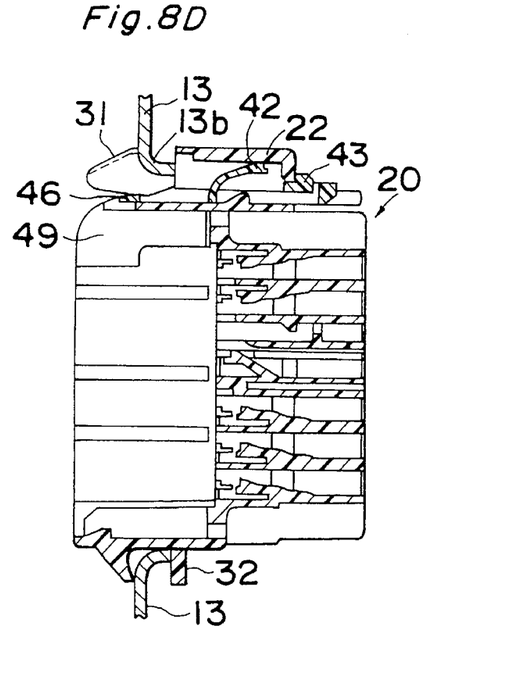
Figure 10:
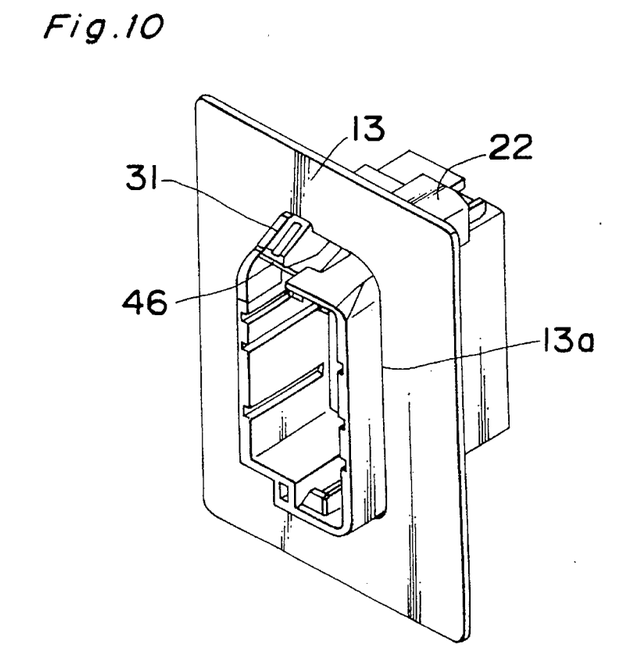
FIG. 10 is a perspective view showing the body-mounted connector at the state shown in FIG. 8D.

When the front end of the spacer 40 extruding from the connector 20 is next pushed in, the channel 47 moves to the back from under the movable locking member 31, and the front pressing member 46 moves under the movable locking member 31. Thus, the movable locking member 31 is pushed up by the pressing member 46, and locked to the door body member 13. During this operation, the arm 42 moves to the inside of the arm housing 22, and the main engagement projection 43 at the back completely engages the top edge of the spacer through-hole 29 at the back of the arm housing 22 (FIG. 8D). In FIG. 10, a perspective view of the connector at the state of FIG. 8C is shown.

During spacer 40 movement, the spacer 40 moves to the main engagement position without the spacer 40 shifting from side because the guide members 48 is guided between the movable locking member 31 and the arm housing 22, and the guide piece 49 moves inside the spacer insertion channel 33. By means of this operation, the connector 20 is fastened to the door body member 13, and the spacer 40 is completely engaged with the connector 20.

As will be known from the above description, because a spacer is temporarily engaged with the connector in a body-mounted connector according to the present invention, the movable locking member of the connector can be pressed to the body side and locked by the spacer by simply pushing on the spacer after insertion to the mounting hole in the body. As a result, when fitting the mating connector to this connector fastened to the body, the connector can be prevented from separating from the body even when pushed by the mating connector, and more secure fastening to the body is possible.

In addition, when the connector with an initially engaged spacer is inserted to the body mounting hole, the projecting movable locking member is flexed into the channel because the movable locking member of the connector is positioned above the top of the channel formed in the spacer, and the connector can be inserted into the body mounting hole with a weak operating force, and other benefits are also obtained.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A body-mounted connector used to mount in a connector mounting hole formed in a body member for connecting to a mating connector, said connector comprising:

connector means provided on one side thereof, said connector means being engageable to said mating connector;

first engaging means provided on said connector means, said first engaging means being engageable to one side surface of said body member;

second engaging means movably provided on said connector means at a position opposed to said first engaging means, said second engaging means being engageable to another side surface of said body member; and spacer means provided adjacent said second engaging means for pressing and locking said second engaging means against said body member and toward said first engaging means such that said connector is firmly secured in said connector mounting hole by clamping said body member between said first and second engaging means.

2. A body-mounted connector as claimed in claim 1, further comprising third engaging means provided adjacent said spacer means for keeping said spacer means at a position away from said second engaging means such that said second engaging means can be freely moved by said body member without contracting said spacer, enabling easy insertion of said connector into said connector mounting hole.

3. A body-mounted connector having a shroud defining a connector socket provided on one side and a terminal housing means provided on the other side thereof, said connector being secured to the body member such that a free end of said shroud projects from a mounting hole formed in said body member, said body-mounted connector comprising:

spacer means slidable along said shroud;

initial engagement means for holding said spacer means in an initially engaged position; and movable locking means projecting at the front of said shroud on which said spacer means slides, whereby when said spacer means is moved toward said terminal housing means, said spacer means is located at a main locking position for supporting, pressing, and locking said movable locking means against said body member, locking said connector to said body member.

4. A body-mounted connector as claimed in claim 3, wherein said shroud is formed larger than said terminal housing means and provided with a spacer through-hole formed in a back wall thereof projecting from said terminal housing means;

said terminal housing means is provided with a projection formed on an outside surface thereof and adjacent said spacer through-hole for partially engaging said spacer means; and said spacer means is provided with a channel formed in the middle portion thereof for defining pressing means on the front end thereof, whereby when said spacer means slides freely along the surface of said shroud through said spacer through-hole, said projection positions said spacer means by contacting the back end thereof at a position at which said pressing means projects from said shroud such that said channel is located below said movable locking means; after insertion of said connector with said spacer means into said body mounting hole and further moving said spacer means, said movable locking means is pressed by said pressing means against said body means and locked, and said projection is inserted into said channel and locks said spacer means.

5. A body-mounted connector as claimed in claim 3, wherein said shroud is formed larger than said terminal housing means and provided with a spacer through-hole formed in a back wall thereof projecting from said terminal housing means;

said shroud is provided with spacer engaging means on the front end portion thereof;

said spacer means is provided with a channel means formed in the middle portion thereof for defining a pressing means on the front end thereof, whereby when said spacer means slides freely along the surface of said shroud through said spacer through-hole, said spacer engaging means positions said spacer means by contacting to the back end thereof at a position at which said pressing means projects from said shroud such that said channel is located below said movable locking means; after insertion of said connector with said spacer means into said body mounting hole and further moving said spacer means, said movable locking means is pressed by said pressing means against said body member and locked, and said spacer engaging means is positioned under said pressing means and locks said spacer means.

6. A body-mounted connector having a shroud defining a connector socket provided on one side thereof, said connector being secured to a body member such that a free end of said shroud projects from a mounting hole formed in said body member, said body mounted connector comprising:

housing means provided on said shroud and opened to a connector socket side, said housing means being provided with initial engagement means on a front end portion and a spacer through-hole formed in a back end wall thereof;

movable locking means provided on said shroud beside said housing means and projecting at an angle toward said connector socket side; and elongated spacer means for being inserted into said housing means and spaced below said movable locking means, said spacer means comprising:

engagement arm means projecting from the front edge portion thereof and engageable to said initial engagement means;

main engagement projection means formed thereon behind said engagement arm means; and a channel formed therein at a position beside said engagement arm means defining pressing means at a front edge portion thereof, whereby when said elongated spacer means slides into said housing means and is spaced below said movable locking means, said engagement arm means is initially engaged with said initial engagement means at a position at which said pressing means projects from said shroud such that said channel is located below said movable locking means; after insertion into said body mounting hole, said engagement arm means is pushed by an edge around said body mounting hole, releasing the engagement between said initial engagement means and said engagement arm means, and said spacer means is then moved rearwardly, causing said movable locking means to be pressed by said pressing means against said body member and locked, thereby locking said main engaging means to a back end of said spacer through-hole.

* * * * *